(12) United States Patent
Davidson

(10) Patent No.: US 12,153,778 B2
(45) Date of Patent: Nov. 26, 2024

(54) PROMPTED TEXT-TO-IMAGE GENERATION

(71) Applicant: Curt Davidson, San Marcos, CA (US)

(72) Inventor: Curt Davidson, San Marcos, CA (US)

( * ) Notice: Subject to any disclaimer, the term of this patent is extended or adjusted under 35 U.S.C. 154(b) by 0 days.

(21) Appl. No.: 18/106,215

(22) Filed: Feb. 6, 2023

(65) Prior Publication Data
US 2024/0264723 A1     Aug. 8, 2024

(51) Int. Cl.
*G06F 3/0484*   (2022.01)
*G06F 9/451*   (2018.01)
*G06N 3/045*   (2023.01)
*G06N 3/0475*   (2023.01)
*G06N 3/08*   (2023.01)
*G06T 11/60*   (2006.01)

(52) U.S. Cl.
CPC ............ *G06F 3/0484* (2013.01); *G06F 9/451* (2018.02); *G06N 3/045* (2023.01); *G06N 3/0475* (2023.01); *G06N 3/08* (2013.01); *G06T 11/60* (2013.01); *G06T 2200/24* (2013.01)

(58) Field of Classification Search
CPC .................................................... G06F 3/0484
USPC ......................................................... 715/771
See application file for complete search history.

(56) References Cited

U.S. PATENT DOCUMENTS

| | | | |
|---|---|---|---|
| 10,733,325 B1 * | 8/2020 | Goodsitt | G06V 10/764 |
| 11,539,918 B1 * | 12/2022 | Libin | H04L 12/1827 |
| 11,613,928 B1 * | 3/2023 | Davidson | E06C 7/50 |
| | | | 182/178.3 |
| 11,622,213 B1 * | 4/2023 | Davidson | H04R 25/558 |
| | | | 381/74 |
| 11,727,507 B1 * | 8/2023 | Davidson | G06Q 30/0633 |
| | | | 705/26.7 |
| 11,769,239 B1 * | 9/2023 | Zhang | G06V 10/82 |
| | | | 382/112 |
| 11,809,688 B1 * | 11/2023 | Parasnis | G06F 3/04812 |
| 11,983,806 B1 * | 5/2024 | Ramesh | G06T 11/60 |
| 2004/0066914 A1 * | 4/2004 | Crosson | G09B 21/009 |
| | | | 379/52 |

(Continued)

OTHER PUBLICATIONS

Working screenshot of "Getting Started with SmartDraw" by Smart draw available online at [https://www.youtube.com/watch?v=5hLaa2J_5cw], published on Apr. 26, 2021. (Year: 2021).*

(Continued)

*Primary Examiner* — Reza Nabi
(74) *Attorney, Agent, or Firm* — James A. Italia; Italia IP

(57) ABSTRACT

Methods, non-transitory computer-readable storage media and computer or computer systems are described which include or relate to inputting or receiving information on one or more image characteristics from a graphical user interface, outputting one or more questions or options for additional details of the one or more image characteristics on a graphical user interface by way of a generative artificial intelligence language model performed on one or more processor, inputting or receiving the additional details from the graphical user interface, and outputting one or more images by way of a generative artificial intelligence text-to-image model performed on one or more processor based on the one or more image characteristics and the additional details.

6 Claims, 4 Drawing Sheets

(56) References Cited

U.S. PATENT DOCUMENTS

| | | | |
|---|---|---|---|
| 2005/0278626 A1* | 12/2005 | Malik | H04L 63/1408 715/201 |
| 2005/0278627 A1* | 12/2005 | Malik | G06F 21/6263 715/255 |
| 2006/0010103 A1* | 1/2006 | Malik | G06F 16/182 |
| 2016/0092473 A1* | 3/2016 | Rodriguez-Serrano | G07F 17/24 707/769 |
| 2019/0108568 A1* | 4/2019 | Liao | G06F 3/04845 |
| 2021/0042724 A1* | 2/2021 | Rathod | G07G 1/0054 |
| 2021/0158815 A1* | 5/2021 | Lee | G06V 10/764 |
| 2021/0192816 A1* | 6/2021 | Watanabe | G06V 20/40 |
| 2022/0222432 A1* | 7/2022 | Meng | G06F 40/103 |
| 2022/0237368 A1* | 7/2022 | Tran | G06N 20/00 |
| 2022/0254177 A1* | 8/2022 | Kappel | G06F 18/285 |
| 2023/0071456 A1* | 3/2023 | Rakshit | G06F 3/011 |
| 2023/0118966 A1* | 4/2023 | Liu | G06F 3/167 345/473 |
| 2023/0147338 A1* | 5/2023 | Okuaki | G11B 27/031 386/282 |
| 2023/0214461 A1* | 7/2023 | Brooks | G06Q 50/184 705/27.1 |
| 2023/0230198 A1* | 7/2023 | Zhang | G06N 3/047 382/276 |
| 2023/0252224 A1* | 8/2023 | Tran | G06F 40/56 715/256 |
| 2023/0325255 A1* | 10/2023 | Lee | G06F 9/542 |
| 2023/0391357 A1* | 12/2023 | Yang | G06V 20/58 |
| 2024/0062008 A1* | 2/2024 | Ghosh | G06F 40/289 |
| 2024/0104789 A1* | 3/2024 | Ghosh | G06F 40/35 |
| 2024/0112088 A1* | 4/2024 | Yu | H04N 19/94 |
| 2024/0126807 A1* | 4/2024 | Kharbanda | G06F 16/538 |
| 2024/0203005 A1* | 6/2024 | Palangi | G06T 7/60 |
| 2024/0226750 A1* | 7/2024 | Benedetto | A63F 13/213 |
| 2024/0233231 A1* | 7/2024 | Taylor | G06T 13/40 |

OTHER PUBLICATIONS

Aaron Rutten, "How to Use DALL-E 2 to generate Images & AI art", available online at ]https://www.youtube.com/watch?v=bEq7NfNH58Q], published on Dec. 19, 2022 (Year: 2022).*

DALL-E 2 Explained by OpenAI, available at [https://www.youtube.com/watch?v=qTgPSKKjfVg], published on Apr. 6, 2022 (Year: 2022).*

"How Stable Diffusion works? Latent Diffusion Models Explained" by Louis Bouchard available online at [https://www.louisbouchard.ai/latent-diffusion-models/] published on Aug. 27, 2022 (Year: 2022).*

\* cited by examiner

210 — Age: ☐3-6, ☐7-10, ☐11-13, ☐14-17

215 — Type of area: ☐ rural, ☐ suburban, ☐ urban

220 — Type of street: ☐ windy, ☐ straight, ☐ tree-lined, ☐ hilly, ☐ cul-de-sac

225 — Type of day: ☐ morning, ☐ afternoon, ☐ twilight, ☐ night

230 — Weather: ☐ sunny, ☐ cloudy, ☐ raining, ☐ snowing, ☐ windy

FIG. 2

PROMPTED TEXT-TO-IMAGE GENERATION

FIELD

The present disclosure is directed to the field of generative artificial intelligence. More particularly, the present disclosure relates to methods, non-transitory computer-readable storage media, and computers or computer systems for prompted text-to-image generation using artificial intelligence.

SUMMARY

In general, in a first aspect, the disclosure features a method. The method includes inputting or receiving information on one or more image characteristics from a graphical user interface, outputting one or more questions or options for additional details on the one or more image characteristics on a graphical user interface by way of a generative artificial intelligence language model performed on one or more processor, inputting or receiving the additional details from the graphical user interface, and outputting one or more images by way of a generative artificial intelligence text-to-image model performed on one or more processor based on the one or more image characteristics and the additional details.

In general, in a second aspect, the disclosure features one or more non-transitory, computer-readable storage media. The one or more non-transitory, computer-readable storage media have instructions for execution by one or more processors, the instructions programmed to cause the one or more processors to input or receive information on one or more image characteristics from a graphical user interface, output one or more questions or options for additional details of the one or more image characteristics on a graphical user interface by way of a generative artificial intelligence language model performed on one or more processor, input or receive the additional details from the graphical user interface, and output one or more images by way of a generative artificial intelligence text-to-image model performed on one or more processor based on the one or more image characteristics and additional details.

In general, in a third aspect, the disclosure features a computer or computer system. The computer or computer system includes one or more processors designed to execute instructions and one or more non-transitory, computer-readable memories storing program instructions for execution by the one or more processors, the instructions programmed to cause the one or more processors to input or receive information on one or more image characteristics from a graphical user interface, output one or more questions or options for additional details of the one or more image characteristics on a graphical user interface by way of a generative artificial intelligence language model performed on one or more processor, input or receive the additional details from the graphical user interface, and output one or more images by way of a generative artificial intelligence text-to-image model performed on one or more processor based on the one or more image characteristics and additional details.

In general, in a fourth aspect, the disclosure features a method. The method includes generating an image display template comprising a plurality of sectors, and receiving input comprising objects or images placed within the sectors to create a composite image. The objects or images are chosen from a word table or icon table.

In general, in a fifth aspect, the disclosure features one or more non-transitory, computer-readable storage media. The one or more non-transitory, computer-readable storage media have instructions for execution by one or more processors, the instructions programmed to cause the one or more processors to generate an image display template comprising a plurality of sectors and receive input comprising objects or images placed within the sectors to create a composite image. The objects or images are chosen from a word table or icon table.

In general, in a sixth aspect, the disclosure features a computer or computer system. The computer or computer system includes one or more processors designed to execute instructions and one or more non-transitory, computer-readable memories storing program instructions for execution by the one or more processors, the instructions programmed to cause the one or more processors to generate an image display template comprising a plurality of sectors and receive input comprising objects or images placed within the sectors to create a composite image. The objects or images are chosen from a word table or icon table.

Features of the methods, non-transitory computer-readable storage media, and computers or computer systems can include the following. Outputting one or more images can include outputting an initial image based on the one or more image characteristics and a refined image based on the one or more image characteristics and the additional details. The generative artificial intelligence language model can be a Generative Pre-trained Transformer model. The generative artificial intelligence text-to-image model can be a Latent Diffusion model.

It should be understood that the methods, non-transitory, computer-readable storage media, and computers or computer systems are not to be considered limitations on the invention defined by the claims. The featured methods, non-transitory, computer-readable storage media, and computers or computer systems can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

FIG. 2 is a representation of a graphical user interface that generates options for inputting additional image characteristics based on previously entered text input of image characteristics according to one implementation.

DETAILED DESCRIPTION

Figure 1:
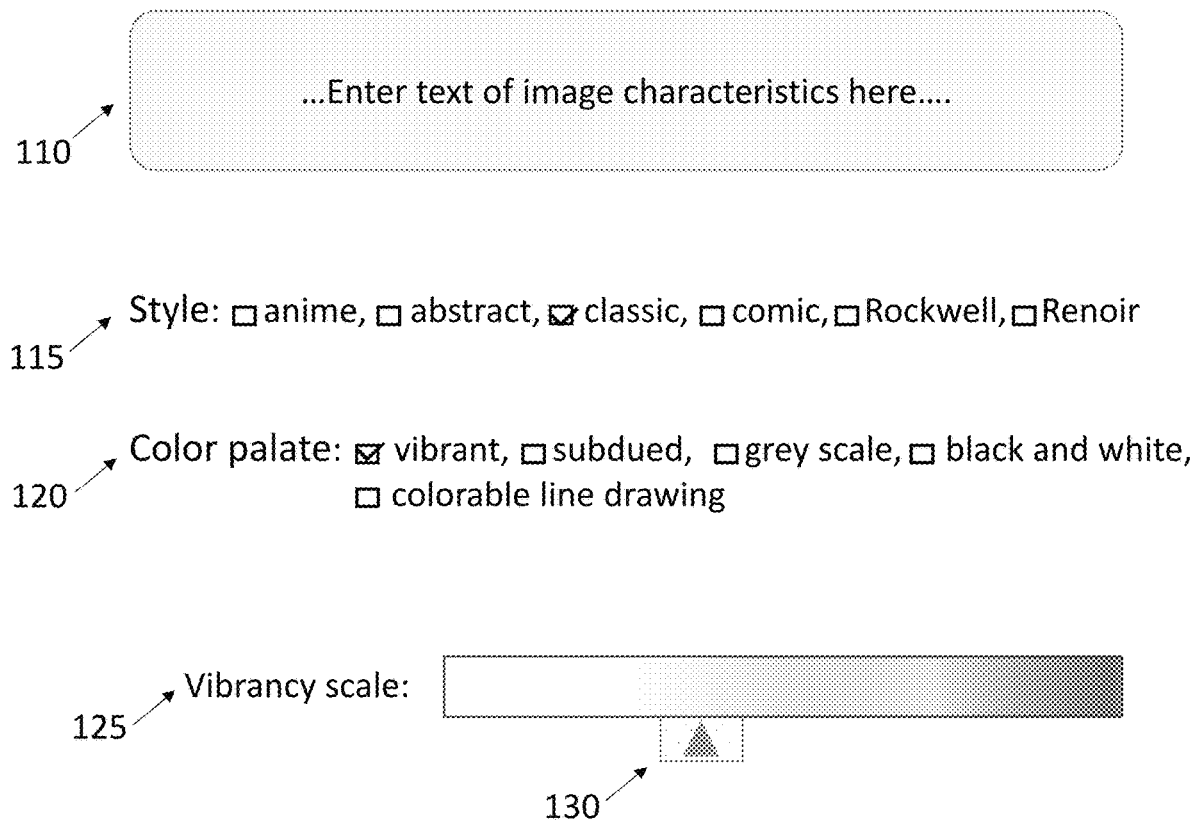
FIG. 1 is a representation of a graphical user interface that elicits text input and other options of one or more image characteristics according to one implementation.

Reference will now be made in detail to various illustrative implementations. It is to be understood that the following discussion of the implementations is not intended to be limiting.

The present disclosure relates to an application, website, or program that allows a person to speak or type one or more image characteristics. The image characteristics can include subject matter, features, or context. The application, program, or website provides a graphical user interface that allows a user to select additional image characteristics such as style and color. The application, website, or program can then assimilate the one or more image characteristics into an initial generated image. The generated image can be a static image or an animated image. The application, program, or website can then use artificial intelligence (AI) to prompt a user to input additional characteristics of the image based on the initial text description of the image, such as by outputting a series of questions or options on details of the image characteristics. The application, website, or program can then refine the image based on the answers or selections by the user. In some implementations, the application, program, or website can omit the initial image but generate a final, refined image based on answers or selections to the series of questions or options. The application, website, or program can also include a graphical user interface that generates an image display template with sectors where a user can select and place objects or images in different sectors to create a composite image. The objects or images can be selected from a source such as a table or list of image descriptions or icons.

According to some implementations, the images are generated from text by way of a trained generative AI model or models. The generative AI models can be trained using a training set comprising millions or billions of images paired with text. In one implementation, the training set is an open-source data set. The open-source data set can be obtained from the Large-scale Artificial Intelligence Open Network (LAION) or similar open-source provider. The generative AI models can use neural networks such as deep learning techniques to produce novel images based on the inputted text and prompts representing one or more image characteristics. In one implementation, the images are produced using a text-to-image diffusion model. The diffusion model works by adding noise to a set of training images, and then learning how to remove the noise to create the novel image. These two processes are known as forward diffusion and reverse diffusion. In forward diffusion, the model adds Gaussian noise to the input image, while in reverse diffusion, the noise that is added is reversed using a Convolution Neural Network (CNN) called a U-Net. The text-to-image diffusion model can be a Latent Diffusion Model that works with compressed images instead of regular images for faster computation. The images are compressed from pixel space to a smaller dimensional latent space where the forward and reverse diffusion processes occur. A final image is generated by converting the representation in latent space back into pixel space. The images can be conditioned on text by a text encoder that transform text prompts to an embedding space. Latent Diffusion Models have been discussed in the computer science literature (see Rombach, R., Blattmann, A., Lorenz, D., Esser, P. and Ommer, B., 2022. High-resolution image synthesis with latent diffusion models. In *Proceedings of the IEEE/CVF Conference on Computer Vision and Pattern Recognition* (pp. 10684-10695), incorporated by reference herein in its entirety). Some existing text-to-image generative AI models include Stable Diffusion and DALL-E 2, but applications based on these often have a simple graphical user interface consisting of a text prompt for input of desired image descriptions. A trained text-to-image diffusion model can be hosted as an application on a web server that receives text input of image characteristics from users logged in to the application remotely, or can be hosted as an application on the user's computer or computing device directly. The trained text-to-image diffusion model can be combined with a trained language-based AI model such as a Generative Pre-trained Transformer model (e.g., GPT-3, an autoregressive language model developed by OpenAI), to generate additional options or questions for the user to refine the image characteristics based on input of initial image characteristics obtained from a text prompt. The generative AI language model uses deep learning to produce human-like text from the text prompt of initial image characteristics entered by the user. The generated text includes a set of options or questions that refine the initial subject matter entered in the text prompt. Instead of being trained on images, the language-based AI model is trained on volumes of text data such as books and articles, and generates text based on patterns found in the text data using neural networks as transformers for processing the text data.

Inputting steps, such as inputting features, context or other characteristics of an image, can be performed through one or more input-output (I/O) interface on a fixed position computer such as a desktop computer or server or on a portable computer/computing device, such as a tablet, laptop, PDA, or smartphone. Visual prompting can take the form of a message, input field, or prompt provided to the user on a display for entering text of desired image characteristics. The input field can be provided as part of a graphical user interface provided on the display of a computer or computing device which provides one or more text entry fields, check boxes, or pull-downs which allow the user to input various image characteristics. Auditory prompting can take the form of speech or a recording broadcast from a speaker which prompts the user to enter the image characteristics. Inputting steps can be performed through traditional inputting means such as a physical keyboard or a keyboard projected on a display, such as a touchscreen. The keyboard can be a QWERTY keyboard or a condensed keyboard commonly used in electronic devices such as cell phones. Inputting can also be performed through the user speaking various desired image characteristics which are inputted through a microphone of the computer or computing device and recognized by speech recognition algorithms programmed on the computer or computing device and converted to text. Outputting steps such as displaying an AI-generated image can be formed through a visual output device such as a display on the computer or computing device.

Computer-executable code or instructions for performing the method steps and embodying the trained generative AI model(s) including its algorithms and equations can be implemented as software or an application capable of being run on the computer(s) or computing device(s). The computer-executable code or instructions can be installed on the computer or computing device during manufacture as software, or implemented as firmware or hardware (e.g., circuitry), or some combination of these. The computer-executable code or instructions can be configured to be downloadable onto the memory of the computer or computing device from a cloud storage source available on the Internet, such as an application retail source (e.g., "app store") capable of being accessed from a mobile phone, tablet, desktop computer, or other programmable device having components or features capable of performing the method steps and implementing the trained generative AI model(s). Examples of suitable Internet-accessible sources include the Apple Store, Google Play, and other sites that make software applications and other downloads available for purchase or license. The computer-executable code or instructions implementing the trained generative AI model(s) can also be hosted as an application on a server or servers accessible to users through a network connection, or can be distributed between a server and an application installed on a user's device.

The computer-readable code, computer-readable instructions, computer-executable instructions, or "software" can be organized into routines, subroutines, procedures, objects, methods, functions, or any other organization of computer-executable instructions that is known or becomes known to a skilled artisan in light of this disclosure, and can be programmed in any suitable programming language, such as Python. Other programming languages include PHP, HTML, XML, XHTML, JavaScript, C, C#, C++, Java, Python, Perl, Ruby, Swift, Visual Basic, and Objective C. By such programming, the computer-readable code, computer-readable instructions, computer-executable instructions, or "software" instruct one or more processors of the computer or computing device to carry out the operations and commands of the application including text-to-image conversion and processing. In some implementations, at least a portion of the computer-readable code, computer-readable instructions, computer-executable instructions, or "software" is available from an open-source code repository publicly accessible on the Internet such as GitHub. The computer-readable code implementing a trained generative AI model or models (such as a text-to-image generative AI model or a generative AI language model) can be stored in memory. Alternatively, or in addition, a library of images paired with text can be stored in memory for additional training of the text-to-image generative AI model, or volumes of text can be stored in memory for additional training of the generative AI language model. The memory can be implemented through non-transitory computer-readable storage media such as RAM. As used in the context of this specification, a "non-transitory computer-readable storage medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM.

In one implementation, a computer system for performing the method steps includes 1) one or more computer that is located remotely from a user and connected to the Internet and to each other and 2) a computer or computing device accessible to the user that can communicate with the remote computer(s) through a network such as the Internet. The remote computer(s) can be a fixed position computer, and the user's computer or computing device can be fixed such as a desktop computer or mobile/portable. The user's computer or device can be a desktop computer, laptop, tablet, gaming device, PDA, or smartphone that can access the graphical user interfaces of the disclosure. The graphical user interfaces can be downloaded together as an application from cloud storage services providing retail application downloading to the user's computer or computing device, or can be hosted on a remote computer which acts as a web server and accessed through the Internet as webpages through an internet browser on the user's computer or computing device. The remote computer(s) can receive image feature, context, or characteristic information inputted by the user through the user interface (either provided as the application on the user's computer or device, or accessed through the web server) and can have a memory capable of housing storages of the inputted information. The memory of the remote computer(s) can house a trained generative AI model or models such as text-to-image diffusion models programmed as computer-readable code used to generate images from text prompts. The memory can also house trained generative AI language models programmed as computer-readable code used to generate text prompts based on initial input of text of desired image characteristics from a user. The generated text prompts refine the image characteristics by eliciting additional details for the desired image. A training set comprising a repository of regular or compressed images paired with text can also be stored in stored in memory on a server or servers that communicate with the user's computer or computing device(s) or other remote computer(s). The training set can be used to further train the generative AI model(s). The remote computer(s) can include the set of computer-executable instructions stored in memory that implement the generative AI models or produce the text prompts. The remote computer(s) can then communicate to the user's computer or computing device images generated by the trained generative AI model(s). The images generated are novel images that match the keywords, characteristics, context, and options inputted by a user of the application, website, or program. In some implementations, some steps of the methods are performed on the user's computer or computing device instead of remotely. In other implementations, all the steps are performed on the user's computer or computing device. The methods need not limited to one particular distribution of functions between those hosted on the user's computer or computer device and those hosted remotely; multiple configurations of programming hosted on one or more computers are contemplated.

Additional embodiments include a computer, computing device, or system or combination thereof capable of carrying out the method and its implementations. The computer, computing device, system or combination thereof can include one or more processors capable of executing the computer-readable code, computer-readable instructions, computer-executable instructions, or "software", one or more interface capable of providing input or output, one or more databases and a set of instructions (e.g., software) stored in a memory of the computer, computing device, or system or combination thereof for carrying out the method and its implementations. The computer, computing device, or system or combination thereof can include one or more stand-alone computer, such as a desktop computer, a portable computer, such as a tablet, laptop, PDA, or smartphone, or a set of computers or devices connected through a network including a client-server configuration and one or more database servers. The network can use any suitable network protocol, including IP, UDP, or ICMP, and may be any suitable wired or wireless network including any local area network, wide area network, Internet network, telecommunications network, Wi-Fi enabled network, or Bluetooth enabled network. In this way, one or more steps of the method can be distributed across the system or combination, or performed on only one computer or computing device, according to specific applications or designs.

Computers, computing devices, or systems thereof described herein can include a variety of components known in the art, including one or more processor, a volatile memory, a non-volatile memory, standard I/O interfaces such as a universal serial bus (USB) port, an HDMI or HDMI ARC port, an optical port, an ethernet port, and/or a serial port, a hard drive, a disk drive, a CD-ROM drive, a motherboard, a printed circuit board (PCB), circuitry for enabling a wireless connection or communication to another device, such as a BLUETOOTH® board, a Wi-Fi board, or a transmitter-receiver for mobile telecommunications, a data bus, an address bus, a control bus, and/or one or more user interface devices including a display, keyboard, keypad, trackpad, mouse, control panel, touch screen display, speaker, camera, and/or microphone. The computers, computing devices, or systems thereof can be equipped with an operating system implemented as software or firmware. As can be appreciated, the computers, computing devices, or systems may differ in their inclusion, exclusion, or configuration of components according to their individual applications or designs.

The following figures described in the Examples below depict different implementations of a graphical user interface of an application and/or website capable of performing method implementations described herein. The graphical user interface will be described with respect to specific icons, fields, buttons, and other features which are displayed on a screen or display of a computer or computing device and are selectable by a user of the application and/or website by way of a mouse, touchscreen, or other input device such as a pen or stylus and provide for input. Selection of the icons and other features by a user activates certain method steps for performing various functions executable as computer program instructions on a stationary computer or portable computer/computing device. These computer program instructions may be provided to one or more processor(s) of a general-purpose computer, special purpose computer, or other programmable data processing device or combination of devices, such that the instructions, which execute via the processor or processors of the computer or other programmable data processing device(s), create means for implementing the method steps. As such, methods described herein can be performed as a series of steps which are implemented as computer-readable code, computer-readable instructions, computer-executable instructions, or "software" performed by one or more processor(s). Such software can be loaded onto a memory or memories of a computer, portable computer/computing device, or system or combination thereof, as an application or program (or multiple applications and/or programs) capable of performing one or more steps of the method implementations. As can be appreciated, different steps or groups of steps of the method implementations can be performed by different computers or computing devices, or some or all can be performed by a single computer or computing device. The Examples provided below are merely illustrative of how the method implementations can be implemented in the context of computer programming, and it is intended that variations of these fall within the scope of the disclosure.

Example 1

A user logs into an application of a generative AI model hosted on the Internet. After logging in, the application displays the graphical user interface shown in FIG. 1. The application provides a text box or prompt 110 for the user to enter initial image characteristic information.

The application then provides static options for the user to choose from, selectable by check boxes, to add more information such as:

Style 115: anime, abstract, classic, comic, Rockwell, Renoir, etc. In the example shown in FIG. 1, the user has selected "classic". A user may be able to provide examples of a particular artist (for example by scanning and/and or uploading representative images) to the application to provide the AI with the style that the user wants its image mimic.

Color palate 120: vibrant, subdued, grey scale, black and white, colorable line drawing (e.g., like a coloring book). In the example shown in FIG. 1, the user has selected "vibrant". This causes a vibrancy scale 125 to appear below, which is selectable with a slidable indicator 130. A similar slidable scale would appear below if the user selected "subdued". In addition, the user is able to select objects within the image and adjust the color palate of each. For example, the user would be able to adjust the color palate of a table where the tabletop could be adjusted independently of the legs or even the color palate of individual legs of the table could be adjusted. Further, the user is also able to select objects in the generated image and resize them (larger or smaller) or reposition them in a drag and drop manner.

The user inputs "A girl rides a bike down a street" either typed into the text box 110 or spoken. The application than uses generative AI to assimilate the keywords and additional information into an image for the user.

The application then provides additional selectable options on the graphical user interface shown in FIG. 2, based on the initial input to obtain additional information to refine the initial image such as:

Age 210: 3-6, 7-10, 11-13, 14-17

Type of area 215: rural, suburban, urban

Type of street 220: windy, straight, hilly, tree-lined, cul-de-sac

Time of day 225: morning, afternoon, twilight, night

Weather 230: sunny, cloudy, raining, snowing, windy.

Based on the selections by the user, the application revises the image to match the detailed criteria inputted by the user.

In addition, the user interface includes the option for the user to input text to accompany the generated image in a manner similar to a comic strip, where the text can be included in or adjacent to the image.

Example 2

Figure 3:
FIG. 3 is a representation of a graphical user interface that has outputted an image based on inputted text input of image characteristics according to one implementation.

An application hosted on the Internet provides two options for generating an image. The first option displays graphical user interfaces similar to FIG. 1 and FIG. 2. In this example, the user has inputted "a man riding a bike" in the text field, and has chosen additional options such as "suburban" street, "partly cloudy" day, and "Boulder, Colorado" as location. An example of an output image is shown in FIG. 3.

Figure 4:
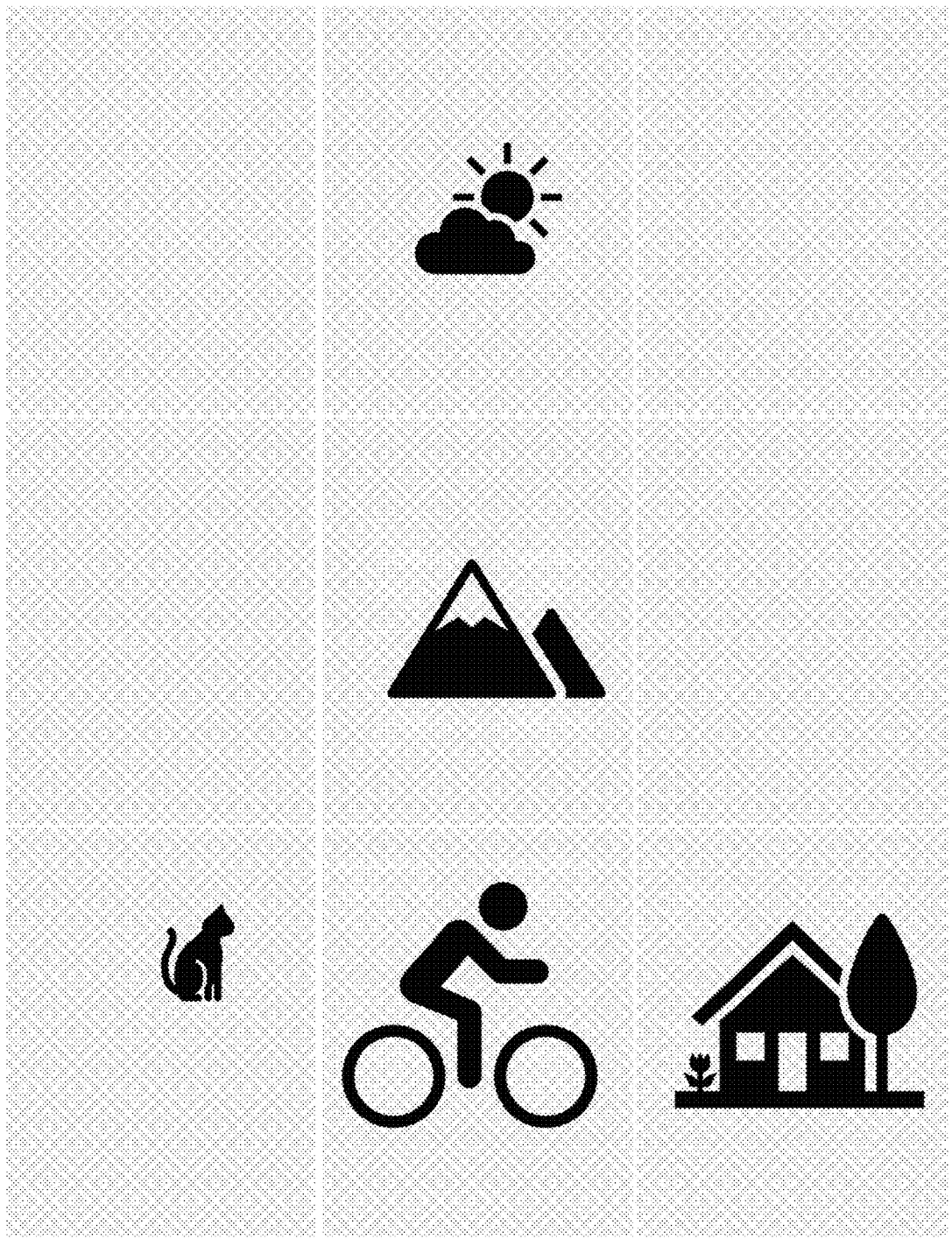
FIG. 4 is a representation of a graphical user interface that provides a template with multiple sectors for placing image objects in the sectors to create a composite image according to one implementation.

The second option provides a word table or icon table of various items (houses, dogs, cats, trees, etc.) on a graphical user interface. This option can be tailored for children to provide an interface for creating images. The user clicks on each item and then the graphical user interface provides a template where the user places the item where they want and even resizes the item. An example of such a template is shown in FIG. 4. The template of FIG. 4 displays 3×3 boxes for a total of nine squares where the user can then place the selected/rendered items in the image to different sectors and even resize the different objects. In the example shown in FIG. 4, different objects are placed in five of the nine sectors to create a composite image similar to the image shown in FIG. 3. Note that if a particular item is not found in the word table, the user can input it and an AI functionality can be utilized to supplement the sword table and/or provide alternatives for the user to select from.

In addition, the user is able to select objects within the image and adjust the color palate of each. For example, the user would be able to adjust the color palate of a table where the tabletop could be adjusted independently of the legs or even the color palate of individual legs of the table could be adjusted. Further, the user is also able to select objects in the generated image and resize them (larger or smaller) or reposition them in a drag and drop manner.

In addition, this embodiment includes the option for the user to input text to accompany the generated image in a manner similar to a comic strip, where the text can be included in or adjacent to the image.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method, comprising:
   inputting or receiving information on one or more image characteristics from a user by way of a text input prompt displayed on a graphical user interface wherein the text input prompt comprises a sentence having a plurality of words; outputting one or more questions or options for additional details of the one or more image characteristics on a category input prompt displayed on the graphical user interface by way of a generative artificial intelligence language model performed on one or more processor, wherein the category input prompt is associated with at least of one of age, type of area, type of street, type of day and weather, wherein the questions or options of the category input prompt are generated based on the information obtained from the text input prompt;
   inputting or receiving the additional details from the user by way of the category input prompt displayed on the graphical user interface; and
   outputting one or more images by way of a generative artificial intelligence text-to-image model performed on one or more processor based on the one or more image characteristics obtained from the text input prompt and the additional details obtained from the category input prompt,
   wherein the generative artificial intelligence language model is a Generative Pre-trained Transformer model.

2. The method of claim 1, wherein the generative artificial intelligence text-to-image model is a Latent Diffusion model.

3. One or more non-transitory, computer-readable storage media having instructions for execution by one or more processors, the instructions programmed to cause the one or more processors to:
   input or receive information on one or more image characteristics from a user by way of a text input prompt displayed on a graphical user interface wherein the text input prompt comprises a sentence having a plurality of words;
   output one or more questions or options for additional details of the one or more image characteristics on a category input prompt displayed on the graphical user interface by way of a generative artificial intelligence language model performed on one or more processor, wherein the category input prompt is associated with at least of one of age, type of area, type of street, type of day and weather, wherein the questions or options of the category input prompt are generated based on the information obtained from the text input prompt;
   input or receive the additional details from the user by way of the category input prompt displayed on the graphical user interface; and
   output one or more images by way of a generative artificial intelligence text-to-image model performed on one or more processor based on the one or more image characteristics obtained from the text input prompt and the additional details obtained from the-category input prompt, wherein the generative artificial intelligence language model is a Generative Pre-trained Transformer model.

4. The one or more non-transitory, computer-readable storage media of The one or more non-transitory, computer-readable storage media of wherein the generative artificial intelligence text-to-image model is a Latent Diffusion model.

5. A computer or computer system, comprising:
   one or more processors designed to execute instructions; and one or more non-transitory, computer-readable memories storing program instructions for execution by the one or more processors, the instructions programmed to cause the one or more processors to:
   input or receive information on one or more image characteristics from a user by way of a text input prompt displayed on a graphical user interface wherein the text input prompt comprises a sentence having a plurality of words;
   output one or more questions or options for additional details of the one or more image characteristics on a category input prompt displayed on the graphical user interface by way of a generative artificial intelligence language model performed on one or more processor, wherein the category input prompt is associated with at least of one of age, type of area, type of street, type of day and weather, wherein the questions or options of the category input prompt are generated based on the information obtained from the text input prompt;
   input or receive the additional details from the user by way of the category input prompt displayed on the graphical user interface; and output one or more images by way of a generative artificial intelligence text-to-image model performed on one or more processor based on the one or more image characteristics obtained from the text input prompt and the additional details obtained from the category input prompt, wherein the generative artificial intelligence language model is a Generative Pre-trained Transformer model.

6. The computer or computer system of claim 5, wherein the generative artificial intelligence text-to-image model is a Latent Diffusion model.

* * * * *